(12) United States Patent
Xu et al.

(10) Patent No.: US 10,976,600 B2
(45) Date of Patent: Apr. 13, 2021

(54) BACKLIGHT, BACKLIGHT MODULE AND DISPLAY APPARATUS

(71) Applicant: BOE TECHNOLOGY GROUP CO., LTD., Beijing (CN)

(72) Inventors: Jian Xu, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/609,613

(22) PCT Filed: Apr. 12, 2019

(86) PCT No.: PCT/CN2019/082467
§ 371 (c)(1),
(2) Date: Oct. 30, 2019

(87) PCT Pub. No.: WO2019/201172
PCT Pub. Date: Oct. 24, 2019

(65) Prior Publication Data
US 2020/0064690 A1 Feb. 27, 2020

(30) Foreign Application Priority Data
Apr. 16, 2018 (CN) .......................... 201820534670.5

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133607* (2021.01); *G02F 1/133614* (2021.01); *G02F 2202/36* (2013.01)

(58) Field of Classification Search
CPC ............... G02F 1/133604; G02F 2001/133607
See application file for complete search history.

(56) References Cited

U.S. PATENT DOCUMENTS

2011/0175518 A1* 7/2011 Reed .......................... F21V 7/22
313/483
2012/0113677 A1 5/2012 Huang et al.
2015/0009453 A1 1/2015 Cha et al.
(Continued)

FOREIGN PATENT DOCUMENTS

CN 102073090 A 5/2011
CN 105402640 A 3/2016
(Continued)

*Primary Examiner* — Jong-Suk (James) Lee
*Assistant Examiner* — Eric T Eide
(74) *Attorney, Agent, or Firm* — Nath, Goldberg & Meyer; Joshua B. Goldberg

(57) ABSTRACT

The present disclosure provides a backlight, a backlight module and a display apparatus. The backlight includes a backplane, a reflective sheet and a plurality of light-emitting elements, the reflective sheet is arranged on an inner surface of the backplane, the backlight also includes at least one light-modifying region, the light-modifying region is arranged on the reflective sheet, the light-modifying region comprises at least one light-converting device, and the light-converting device can carry out optical process on light emitted from the light-emitting elements.

17 Claims, 9 Drawing Sheets

(56) References Cited

U.S. PATENT DOCUMENTS

| | | | | |
|---|---|---|---|---|
| 2015/0160513 A1* | 6/2015 | Lee | ................... | G02F 1/133605 |
| | | | | 349/69 |
| 2015/0369454 A1* | 12/2015 | Lee | ................... | G02F 1/133603 |
| | | | | 362/97.1 |
| 2018/0356685 A1* | 12/2018 | Jang | ..................... | G02B 6/0035 |
| 2019/0049762 A1* | 2/2019 | Yonemoto | ......... | G02F 1/133605 |
| 2019/0107659 A1 | 4/2019 | Li et al. | | |
| 2019/0293970 A1* | 9/2019 | Kim | ..................... | H01L 33/504 |
| 2020/0064690 A1 | 2/2020 | Xu et al. | | |

FOREIGN PATENT DOCUMENTS

| CN | 107045228 A | 8/2017 |
|---|---|---|
| CN | 107065305 A | 8/2017 |
| CN | 107238969 A | 10/2017 |
| CN | 208041696 U | 11/2018 |

\* cited by examiner

BACKLIGHT, BACKLIGHT MODULE AND DISPLAY APPARATUS

CROSS REFERENCE TO RELATED APPLICATIONS

This is a National Phase Application filed under 35 U.S.C. 371 as a national stage of PCT/CN2014/078779, filed May 29, 2014, an application claiming priority to Chinese patent application No. 201820534670.5, entitled "backlight, backlight module and display apparatus" filed in Chinese Intellectual Property Office on Apr. 16, 2018, the entire disclosure of which is incorporated herein by reference.

TECHNICAL FIELD

The present disclosure relates to the field of display apparatus, and in particular, to a backlight, a backlight module including the backlight, and a display apparatus including the backlight module.

BACKGROUND

In a display apparatus in which a pixel device cannot actively emit light, such as a liquid crystal display apparatus, an electronic paper book, an electrochromic display apparatus, a backlight for providing a light source is generally included.

As a preferred solution to improve display color gamut, quantum dot backlight has been widely used.

SUMMARY

According to an aspect of the present disclosure, there is provided a backlight, which includes a backplane, a reflective sheet and a plurality of light-emitting elements, an accommodating space is defined on an inner surface of the backplane, the reflective sheet is located on the inner surface of the backplane, the backlight further includes at least one light-modifying region, the light-modifying region is on the reflective sheet, and the light-modifying region includes at least one light-converting device, the light-converting device being capable of carrying out optical process on light emitted from the light-emitting elements.

In some implementations, the light emitted from the light-emitting elements is monochromatic light and the optical process is to convert the monochromatic light into mixed light.

In some implementations, the mixed light is white light.

In some implementations, the light-modifying region includes a plurality of light-converting devices arranged in an array.

In some implementations, the backplane includes a bottom plate and a sidewall provided around edges of the bottom plate, the sidewall including longitudinal sidewalls and lateral sidewalls, the light-modifying region being provided on the reflective sheet located on at least one of the sidewall and the bottom plate.

In some implementations, the plurality of light-emitting elements are arranged in a plurality of rows and a plurality of columns on the bottom plate in the accommodating space, the light-modifying region including a plurality of first light-modifying regions located on at least one of the lateral sidewalls and the longitudinal sidewalls, the first light-modifying regions located on the lateral sidewalls in a row direction of the light-emitting elements correspond to the columns of the light-emitting elements, and the first light-modifying regions located on the longitudinal sidewalls in a column direction of the light-emitting elements correspond to the rows of the light-emitting elements, the row direction of the light-emitting elements is parallel to the lateral sidewalls, and the column direction of the light-emitting elements is parallel to the longitudinal sidewalls.

In some implementations, the plurality of light-converting devices in each of the first light-modifying regions are arranged in a plurality of rows and a plurality of columns, a size of each of the light-converting devices in a same first light-modifying region is inversely correlated to a distance between the light-converting device and the light-emitting element corresponding to the first light-modifying region.

In some implementations, each of the light-emitting elements includes a package region, a width, in a row direction, of each of the first light-modifying regions located on the lateral sidewalls is less than or equal to a width of the package region of the light-emitting element, and a width, in a column direction, of each of the first light-modifying regions located on the longitudinal sidewalls is less than or equal to the width of the package region of the light-emitting element.

In some implementations, the light-modifying region further includes at least one second light-modifying region located on at least one of the lateral sidewalls and the longitudinal sidewalls, the second light-modifying region being adjacent to the first light-modifying region.

In some implementations, the second light-modifying region on the lateral sidewall is located between two adjacent columns of the light-emitting elements, and the second light-modifying region on the longitudinal sidewall is located between two adjacent rows of the light-emitting elements.

In some implementations, a plurality of light-converting devices in the second light-modifying region are arranged in a plurality of rows and a plurality of columns, a size of each of the light-converting devices in a same second light-modifying region is inversely correlated to a distance between the light-converting device and the light-emitting element corresponding to the second light-modifying region.

In some implementations, the light-modifying region further includes at least one third light-modifying region, the third light-modifying region being located on the reflective sheet at an edge of the bottom plate adjoined to the sidewall and being adjacent to the first light-modifying region.

In some implementations, the plurality of light-converting devices in the third light-modifying region are arranged in a plurality of rows and columns, and a size of each of the light-converting devices in a same third light-modifying region is positively correlated with the distance between the light-emitting element corresponding to the third light-modifying region.

In some implementations, the light-modifying region further include at least one fourth light-modifying region, a plurality of the light-converting devices in the fourth light-modifying region being arranged to surround a corresponding one of the light-emitting elements.

In some implementations, a size of each of the light-converting devices in the fourth light-modifying region is inversely correlated to a distance between the light-converting device and the light-emitting element corresponding to the fourth light-modifying region.

In some implementations, each of the light-emitting elements includes a lens device and a light-emitting diode, the light-emitting diode is located on the bottom plate, the lens device is located on top of the light-emitting diode, and a space exists between the lens device and the reflective sheet on the bottom plate, and an orthographic projection of the fourth light-modifying region on the reflective sheet falls within an orthographic projection of the lens device on the reflective sheet.

In some implementations, in any one of the first light-modifying region, the second light-modifying region, the third light-modifying region, and the fourth light-modifying region, the light-converting devices are arranged in a staggered manner.

In some implementations, a shape of each of the light-converting devices is circular, and a size of each of the light-converting devices in the first light-modifying region, in the second light-modifying region, in the third light-modifying region, and in the fourth light-modifying region is a diameter of the light-converting device.

In some implementations, each of the light-converting devices includes a quantum dot material.

In some implementations, each of the light-emitting elements is capable of emitting blue light.

According to another aspect of the present disclosure, there is provided a backlight module, which includes a backlight and a quantum dot layer, the backlight is the backlight described above, the quantum dot layer is located on a light exiting side of the backlight, and the quantum dot layer is capable of converting light emitted from the light-emitting elements into white light.

According to still another aspect of the present disclosure, there is provided a display apparatus, which includes a display panel and a backlight module located at a light incoming side of the display panel, the backlight module is the backlight module described above, and the quantum dot layer is located between the backlight and the display panel.

BRIEF DESCRIPTION OF THE DRAWINGS

The drawings are intended to provide a further understanding of the disclosure, constitute a part of this specification, and are used to explain the present disclosure together with the following specific embodiments, but are not to be construed as limiting.

In the drawings.

DETAILED DESCRIPTION

Embodiments of the present disclosure will be described in detail below with reference to the accompanying drawings. It should be understood that the embodiments described herein are merely used to illustrate and explain the present disclosure, but not intended to limit the present disclosure.

In the related art, a quantum dot backlight includes a plurality of light-emitting elements, an optical assembly converting a point light source into a surface light source, and a quantum dot layer converting light emitted from the light-emitting elements into white light.

However, color shift may occur during displaying of a display apparatus including the quantum dot backlight, which degrades user's experiences. For example, when the light emitted from the light-emitting elements is blue light, bluish picture may be displayed when the display apparatus including the quantum dot backlight is displaying.

It has been found that the reason why color shift occurs when the display apparatus including the quantum dot backlight displays is as follows. For quantum dot material, its light conversion efficiency is constant, and when a brightness of color light irradiated on the quantum dot material is too high, only the color light within a range of its light conversion efficiency can be converted into white light, and the light beyond the range of its light conversion efficiency is still the color light. For a quantum dot backlight, when an intensity of light emitted from the light-emitting elements exceeds a conversion efficiency of the quantum dot layer, a phenomenon in which a portion of color light is converted into white light, and another part of color light is not converted into white light occurs. Accordingly, color shift may occur when the display apparatus displays.

Figure 1:
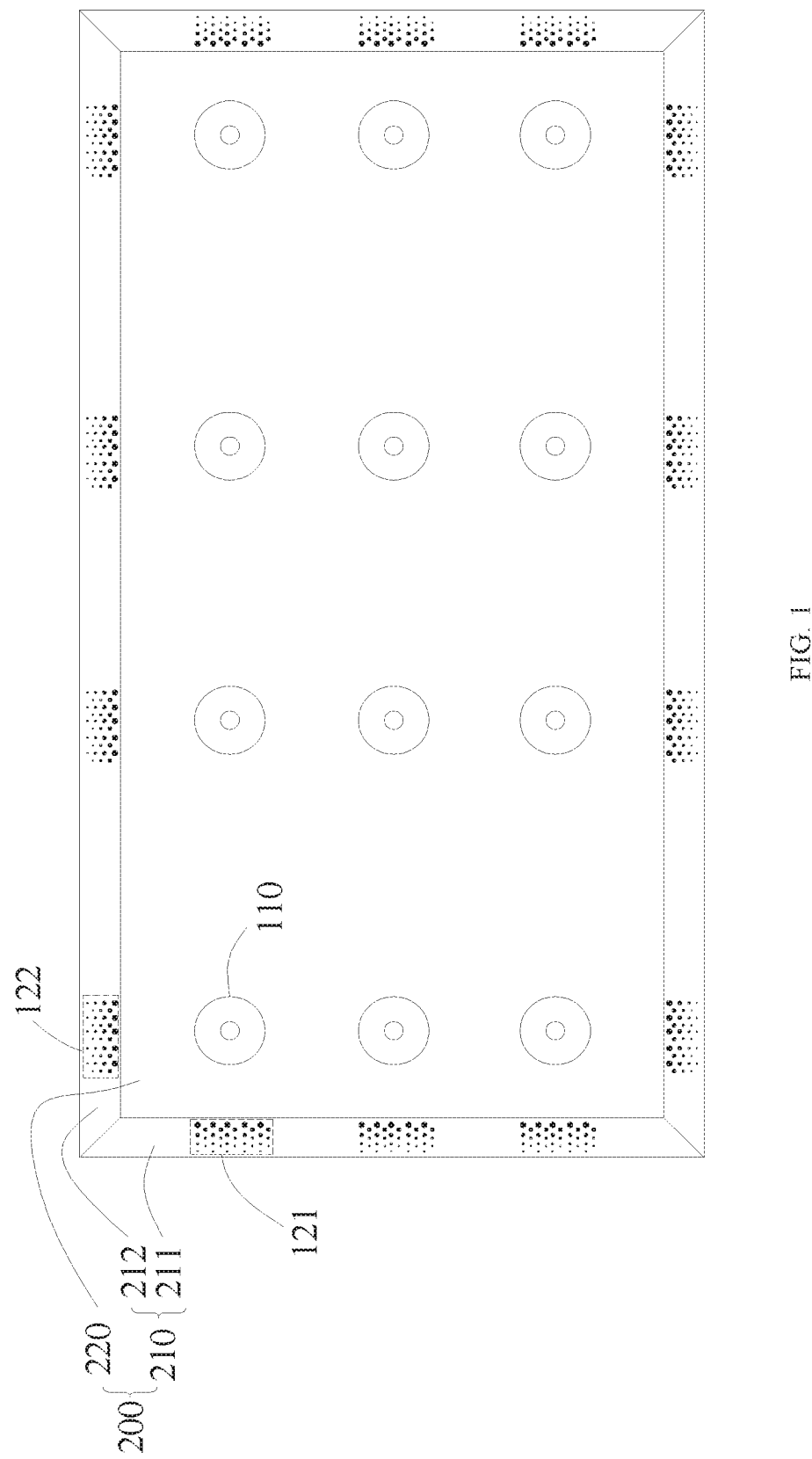
FIG. 1 is a schematic diagram of a backlight according to an embodiment of the present disclosure.
Figure 2:
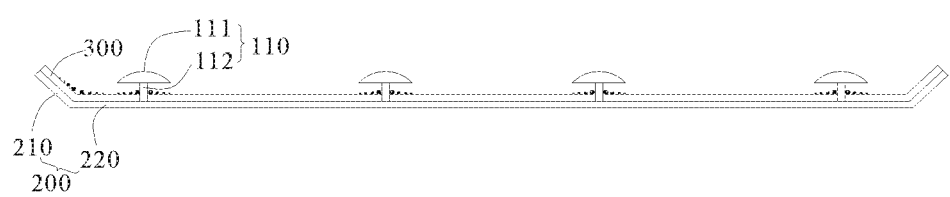
FIG. 2 is a cross-sectional schematic diagram of a backlight according to an embodiment of the present disclosure.

In view of above, as a first aspect of the present disclosure, a backlight is provided. As shown in FIGS. 1 and 2, the backlight includes a backplane 200, a reflective sheet 300 (see FIG. 2), and a plurality of light-emitting elements 110. As shown in FIG. 2, an accommodating space is defined at an inner surface of the backplane 200, the reflective sheet 300 is provided on the inner surface of the backplane, and the light-emitting elements 110 may be provided in the accommodating space (see FIGS. 1 and 2) or may be provided at a side of the backplane 200. The backlight further includes at least one light-modifying region provided on the reflective sheet 300. The light-modifying region includes at least one light-converting device (e.g., the dot-like structures shown in FIGS. 1 and 2) therein, which is capable of performing optical processing on light emitted by the light-emitting elements 110.

In some implementations, the light emitted by the light-emitting elements 110 is monochromatic light and the optical processing is used to convert the monochromatic light into mixed light. For example, the light emitted from the light-emitting elements 110 is color light (e.g., blue light, green light, or the like). In some specific examples, the light-emitting elements are capable of emitting blue light, but the present disclosure is not limited thereto. After the light emitted by the light-emitting elements 110 is irradiated on the light-converting devices in the light-modifying region, the light-converting devices convert at least a portion of color light into mixed light. The mixed light is light formed by mixing multiple colors of light together. In some specific examples, the mixed light is white light. White light is a mixed light that may be obtained by mixing three primary colors of light (blue light, red light, and green light) in a certain percentage, but the present disclosure is not limited thereto. For convenience of explanation, the mixed light is described as white light.

The backlight provided by the present disclosure cooperates with the quantum dot layer to form a backlight module, and the quantum dot layer can convert light emitted by the light-emitting elements into white light.

In the light-modifying region, the light irradiated on the light-modifying region includes color light directly irradiated on the light-modifying region from the light-emitting elements, and also includes color light reflected onto the light-modifying region by the reflective sheet 300 or other film structures. Accordingly, after the color light is irradiated on the light-converting devices in the light-modifying region, the light-converting devices may convert at least a portion of the color light into white light, and then emit the converted white light toward the quantum dot layer. Since at least a portion of the light has already been converted into white light by the light-converting devices in the light-modifying region before the light emitted from the light-modifying region being irradiated onto the quantum dot layer, the remaining color light irradiated onto the quantum dot layer, which has not been converted into white light, can be converted into white light by the quantum dot layer. Therefore, the light-modifying region is configured to supplement the light conversion capability of the quantum dot layer, so that the light emitted from a part of the quantum dot layer corresponding to the light-modifying region is white light with high purity, and the color shift phenomenon when the display apparatus including the backlight is displaying a picture can be reduced at least to a certain extent.

Figure 3:
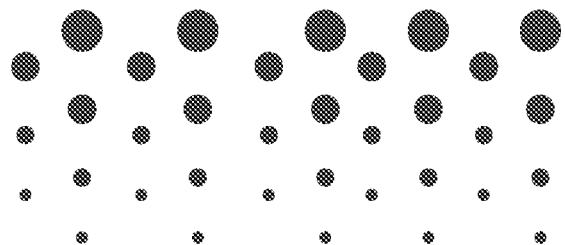
FIG. 3 is a schematic diagram of a first light-modifying region according to an embodiment of the present disclosure.

In some implementations, the light-modifying region includes a plurality of light-converting devices arranged in an array. That is, in each light-modifying region, a plurality of light-converting devices may be included, and the plurality of light-converting devices may be arranged in an array, as shown in FIG. 3. Certainly, the plurality of light-converting devices may be arranged in any other manner as needed, and the present disclosure is not limited thereto.

In some implementations, each of the light-converting devices includes a quantum dot material, and the quantum dot material is capable of converting light emitted from the light-emitting elements into white light. In the present disclosure, there is no particular limitation on how a light-converting device is made by using a quantum dot material. For example, the quantum dot material may be made into optical coatings and then printed or sprayed to form the light-converting devices. Certainly, any other material capable of converting color light into white light may be used, and the disclosure is not limited thereto. In some implementations, the backplane 200 includes a bottom plate 220 and a sidewall 210 provided around edges of the bottom plate 220, the sidewall 210 including longitudinal sidewalls 211 and lateral sidewalls 212, and light-modifying regions are provided on the reflective sheet located on at least one of the sidewall 210 and the bottom plate 220. That is, the longitudinal sidewalls 211 and/or the lateral sidewalls 212 of the sidewall 210, and/or the bottom plate 220 are/is provided with the light-modifying region thereon. The light-modifying region being provided on the reflective sheet on the sidewall 210 and/or bottom plate 220 may convert a portion or all of the color light irradiated/reflected to a corresponding position into white light.

In some implementations, the plurality of light-emitting elements 110 are arranged in a plurality of rows and columns on the bottom plate 220 in the accommodating space, and the light-modifying region includes a plurality of first light-modifying regions provided on at least one of the lateral sidewalls and the longitudinal sidewalls, the first light-modifying regions provided on the lateral sidewalls 212 along a row direction of the light-emitting elements 110 correspond to the columns of the light-emitting elements, and the first light-modifying regions provided on the longitudinal sidewalls 211 along a column direction of the light-emitting elements correspond to the rows of the light-emitting elements, the row direction of the light-emitting elements 110 is parallel to the lateral sidewalls 212, and the column direction of the light-emitting elements is parallel to the longitudinal sidewalls 211.

Here, the first light-modifying regions provided on the lateral sidewalls 212 in the row direction of the light-emitting elements 110 corresponding to the columns of the light-emitting elements means that each of center positions of the first light-modifying regions provided on the lateral sidewalls 212 are in a same straight line as centers of the light-emitting elements of a corresponding column, and the straight line is parallel to the longitudinal sidewalls. For example, as shown in FIG. 1, the center position of a first one of the first light-modifying regions (in a left-to-right direction) on the lateral sidewall 212 on an upper side of the backplane 200 is in a same straight line as the centers of light-emitting elements of a first column (in a left-to-right direction) on the bottom plate 220. Similarly, the first light-modifying region provided on the longitudinal sidewalls 211 along the row direction of the light-emitting elements corresponding to the rows of light-emitting elements, means that each of center positions of the first light-modifying regions provided on the longitudinal sidewalls 211 is in a same straight line as centers of the light-emitting elements of a corresponding row, and the straight line is parallel to the lateral sidewalls 212. The present disclosure is not limited thereto.

Specifically, as shown in FIG. 1, in a case where the plurality of light-emitting elements 110 are provided on the backplane 220, the backlight is a direct type backlight. In the direct type backlight, the sidewall 210 is bent upward to form a slope angle with the bottom plate 220. The reflective sheet 300 on the bottom plate 220 extends along the bent sidewall 210 to edges of the sidewall. Bottom end of the sidewall 210 is adjoined to the bottom plate 220, and top end of the sidewall 210 adjoins an optical film layer. The optical film layer may include a prism sheet, a diffusion sheet, and the like. Since a surface of the optical film layer facing the backplane also has light reflecting properties, and a portion of the reflective sheet 300 on the sidewall 210 is closer to the optical film layer than another portion of the reflective sheet 300 on the bottom plate 220, it results in a brightness at the sidewall being greater than that at the bottom plate. Accordingly, in some implementations of the present disclosure, the reflective sheet 300 is provided with the first light-modifying regions 122 thereon at positions thereof on the lateral sidewalls 212 corresponding to the columns of the light-emitting elements 110, and the reflective sheet 300 is provided with the first light-modifying regions 121 at positions thereof on the longitudinal sidewalls 211 corresponding to the rows of the light-emitting elements 110, as shown in FIG. 1.

The light-converting devices provided in the first light-modifying regions 121 on a portion of the reflective sheet 300 on the longitudinal sidewalls 211 can convert at least a portion of the light irradiated on the first light-modifying regions into white light, thereby preventing impure-andcolored white light from occurring in the light emitted from a corresponding region in a backlight module including the backlight. Similarly, the light-converting devices provided in the first light-modifying regions 122 on a portion of the reflective sheet 300 on the lateral sidewalls 212 can convert at least a portion of the light irradiated on the first light-modifying regions 122 into white light, thereby preventing impure-and-colored white light from occurring in the light emitted from a corresponding region in the backlight module including the backlight.

In the present disclosure, specific structure of the backlight may not be limited, and the backlight may also be a side-in type backlight, that is, the light-emitting elements 110 are provided at a side of the bottom plate 220 instead of being provided on the bottom plate 220.

In some implementations, the plurality of light-converting devices in each first light-modifying region are arranged in a plurality of rows and a plurality of columns, and in a same first light-modifying region, a size of each of the light-converting devices is inversely correlated to a distance between the light-converting device and the light-emitting element corresponding to the first light-modifying region. Specifically, as shown in FIGS. 1 and 2, the plurality of light-converting devices in each of the first light-modifying regions 122 on the reflective sheet 300 located on the lateral sidewalls 212 and the plurality of light-converting devices in each of the first light-modifying regions 121 on the reflective sheet 300 located on the longitudinal sidewalls 211 are all arranged in a plurality of rows and a plurality of columns.

Due to the limitation of process, a uniform brightness of regions of the backlight is difficult to be achieved. For the backlight, the probability that an intensity of color light of a region with large brightness exceeds the conversion efficiency of the quantum dot layer cooperating with the backlight is large, so in some implementations of the present disclosure, the light-modifying regions may be provided in regions with large brightness in the backlight, and the light-modifying regions are first used to convert the light of the regions with the large brightness, so that the phenomenon of color non-uniformity of the display apparatus during displaying may be avoided.

For the reflective sheet located on the sidewall, the closer the position is to the light-emitting elements, the greater the brightness thereon. Accordingly, the brightness of the region directly facing the light-emitting elements is a region with the greater brightness in the entire backlight. In order to improve color uniformity of the light emitted from the first light-modifying region provided on the portion of the reflective sheet on the sidewall, in some implementations of the present disclosure, in the first light-modifying regions on the reflective sheet located on the sidewall, a size of each of the light-converting devices is inversely correlated to a distance between the light-converting device and the light-emitting element, that is, the closer the position is to the light-emitting element, the greater the size of the light-converting device, so that uniformity of color of light emitted from the first light-modifying region can be ensured. This is because the larger the size of the light-converting device is, the more quantum dot material is, the higher the conversion efficiency thereof is.

In the present disclosure, a specific structure of the light-emitting element is not particularly limited. In some specific examples of the present disclosure, the light-emitting element may include a light emitting diode. It is easily understood that the light-emitting element has a package region.

In some implementations, in a case where the light-emitting element 110 includes a package region, a width, in a row direction, of each of the first light-modifying regions provided on the lateral sidewalls 212 is less than or equal to a width of the package region of the light-emitting element 110, and a width, in a column direction, of each of the first light-modifying regions provided on the longitudinal sidewalls 211 is less than or equal to a width of the package region of the light-emitting element 110.

Specifically, a first light-modifying region may be provided on the reflective sheet located on the sidewall 210 at a portion of the reflective sheet facing to the light-emitting element 110 and within a widthwise range of the package region of the light-emitting element 110, for example, three columns or three rows of light-converting devices may be provided in the first light-modifying region, and a total width of the three column or the three rows of light-converting devices is less than or equal to the width of the package region of the light-emitting element, so that it may be avoided that an excessive amount of color light is converted into white light before the light being incident on the quantum dot layer. Certainly, it is also possible to define a diameter of the light-converting device to be less than half the width of the package region of the light-emitting element, so that at least two rows or two columns of light-converting devices may be provided in the first light-modifying region. By arranging the light-converting devices corresponding to the package region of the light-emitting diode as above, an optimal reflection effect of the optical modification point can be ensured, and a strong intensity of color light in an area can be weakened.

Since there is interference of light between light emitted from two adjacent rows or columns of light-emitting elements on the bottom plate 220, and an interference region is located between the two adjacent rows or columns of light-emitting elements, it is easily understood that a brightness of the interference region is greater than that of the regions adjacent to the interference region. Thus, in some implementations, second light-modifying regions may also be provided in the interference region.

Figure 4:
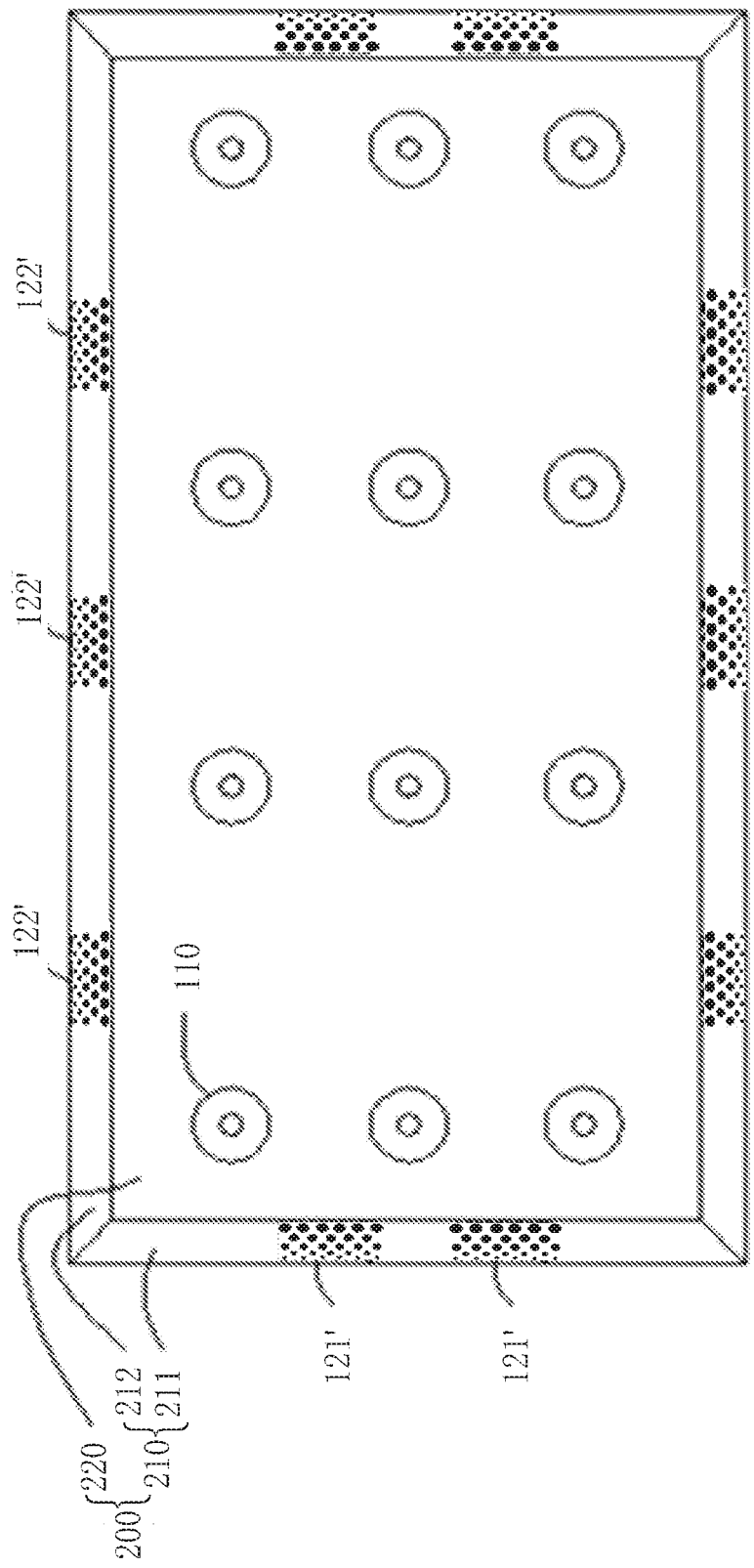
FIG. 4 is a schematic diagram of a second light-modifying region according to an embodiment of the present disclosure.

In some implementations, the light-modifying region further includes at least one second light-modifying region provided on at least one of the lateral sidewalls and the longitudinal sidewalls, the second light-modifying region being provided adjacent to the first light-modifying region. For example, the second light-modifying region on the lateral sidewall is provided between two adjacent columns of the light-emitting elements. The second light-modifying region on the longitudinal sidewall is provided between two adjacent rows of the light-emitting elements. Specifically, as shown in FIG. 4, the second light-modifying region may be provided between two adjacent first light-modifying regions 122 on the lateral sidewall 212 and/or between two adjacent first light-modifying regions 121 on the longitudinal sidewall 211. That is, a portion of the reflective sheet, which is on the longitudinal sidewall 211 and faces to a portion between any two adjacent rows of the light-emitting elements 110, is provided with the second light-modifying region 121' thereon, and/or a portion of the reflective sheet 300, which is on the lateral sidewall 212 and faces to a portion between any two adjacent columns of the light-emitting elements, is provided with the second light-modifying region 122' thereon. Specifically, a center position of the second light-modifying region 121' and a center position between any two adjacent rows of light-emitting elements 110 are located in a same straight line, and the straight line is parallel to the lateral sidewalls. A center position of the second light-modifying region 122' and a center position between any two adjacent columns of light-emitting elements 110 are located in a same straight line, and the straight line is parallel to the longitudinal sidewalls.

The second light-modifying region 121' on the portion of the reflective sheet 300 located on the longitudinal sidewall 211 can convert at least a portion of color light of a corresponding region into white light, and the second light-modifying region 122' on a portion of the reflective sheet 300 located on the lateral sidewall 212 can convert at least a portion of color light of a corresponding region into white light, so that the color shift phenomenon caused by light interference can be reduced or even avoided.

In some implementations, the plurality of light-converting devices in the second light-modifying region are arranged in a plurality of rows and a plurality of columns, and a size of each of the light-converting devices in a same second light-modifying region is inversely correlated to a distance between the light-converting device and the light-emitting element corresponding to the second light-modifying region. Specifically, as shown in FIG. 4, in each of the second light-modifying regions 121' on the longitudinal sidewalls 211 and the second light-modifying regions 122' on the lateral sidewalls 212, the light-converting devices may be arranged in a plurality of rows and a plurality of columns, and the size of each of the light-converting devices in a same second light-modifying region is inversely correlated to the distance between light-converting device and the light-emitting element corresponding to the second light-modifying region.

Figure 5:
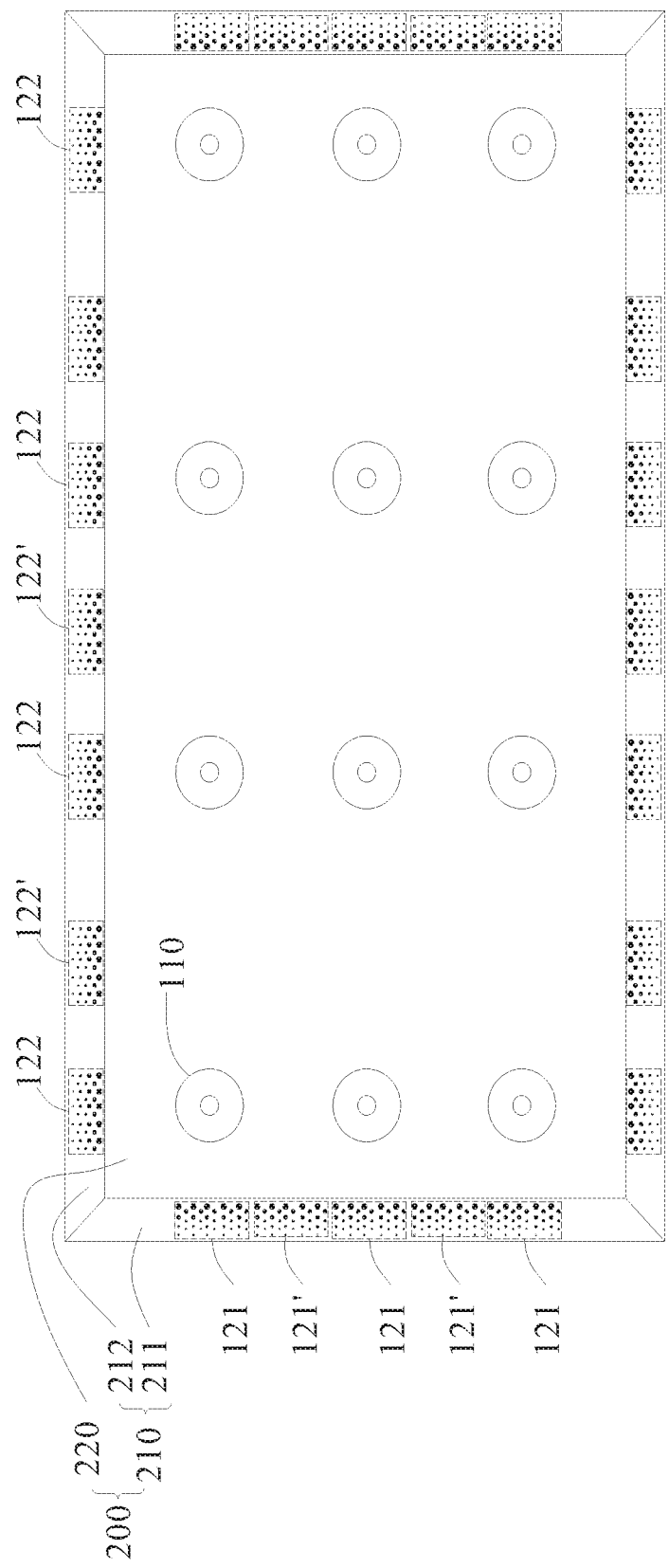
FIG. 5 is a schematic diagram of a backlight according to an embodiment of the present disclosure.

Certainly, the first modifying regions and second light-modifying regions may both be provided on a same backplane 200, as shown in FIG. 5. A width of the second light-modifying region 122' on the lateral sidewall may be set to be equal to the width of the first light-modifying region on the lateral sidewall, and a width of the second light-modifying region 121' on the longitudinal sidewall may also be set to be equal to the width of the first light-modifying region on the longitudinal sidewall, or the width of each second light-modifying region may be set as desired.

Figure 6:
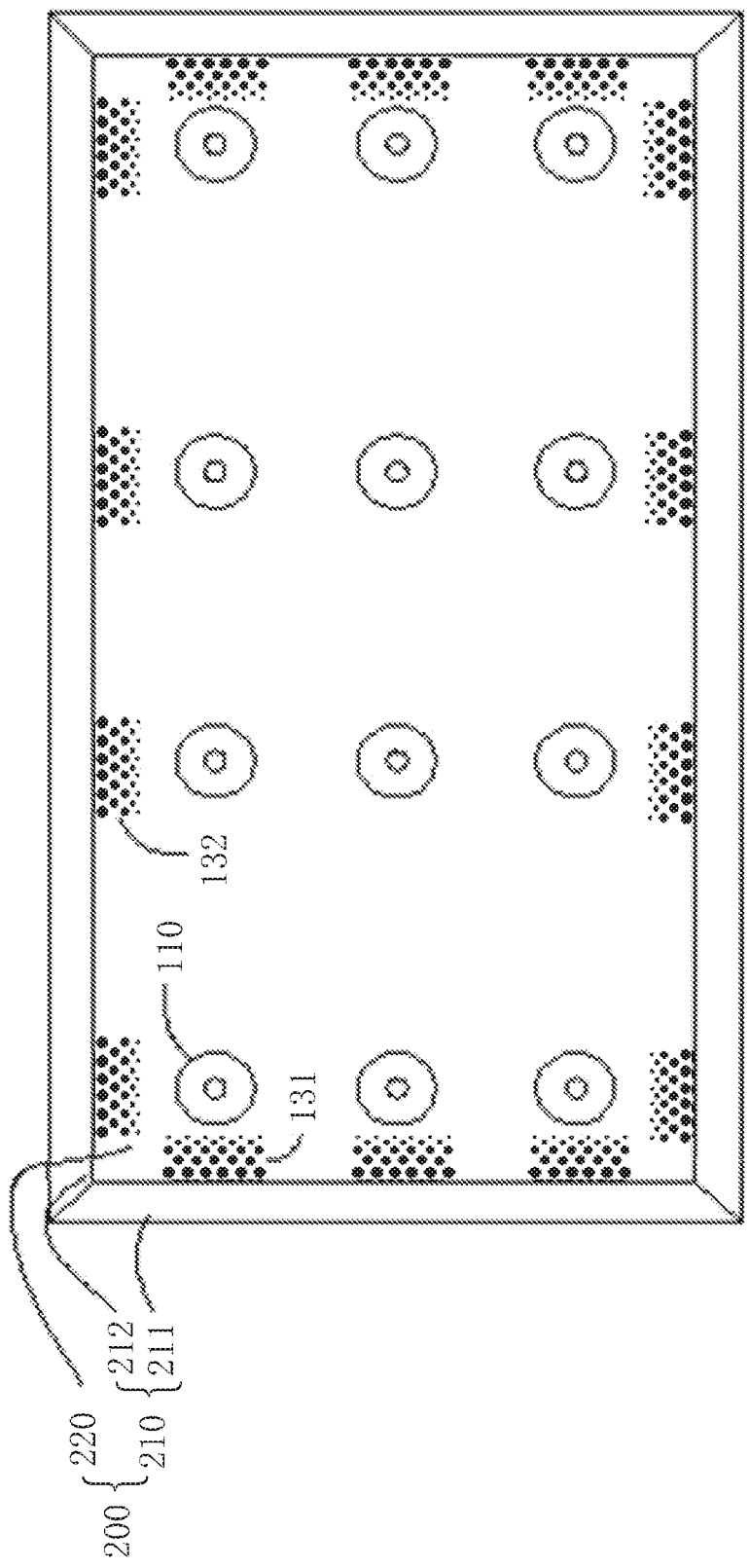
FIG. 6 is a schematic diagram of a third light-modifying region according to an embodiment of the present disclosure.

As shown in FIG. 6, in the direct type backlight, the bottom plate 220 and the sidewall 210 of the backplane 200 are both provided with the reflective sheet 300, and a portion of light reflected by the reflective sheet 300 on the sidewall is reflected to the reflective sheet 300 on the bottom plate 220. Specifically, the brightness is relatively large at an adjoiner of the portion of the reflective sheet 300 located on the bottom plate 220 and the portion of the reflective sheet 300 located on the sidewall 210. To avoid color shift of light exiting from the adjoiner, in some implementations, the light-modifying region further includes a third light-modifying region adjacent to the first light-modifying region and provided on the reflective sheet at a border of the bottom sheet proximal to the sidewall.

Specifically, as shown in FIG. 6, the third light-modifying regions 131 are provided at positions of the reflective sheet 300 at borders of the bottom plate 220 and facing the rows of the light-emitting elements 110, and/or the third light-modifying regions 132 are provided at positions of the reflective sheet 300 at borders of the bottom plate 220 and facing the columns of the light-emitting elements 110.

On the reflective sheet, the closer the position is to the edge of the bottom plate, the greater the brightness. In order to convert the light incident on the position into light with uniform color, in some implementations, the light-converting devices in each of the third light-modifying regions are arranged in a plurality of rows and a plurality of columns, and a size of each of the light-converting devices in a same third light-modifying region is positively correlated to a distance between the light-converting device and the light-emitting element corresponding to the third light-modifying region. That is, the closer the light-converting device is to the light-emitting element, the smaller the size of the light-converting device is.

Figure 7:
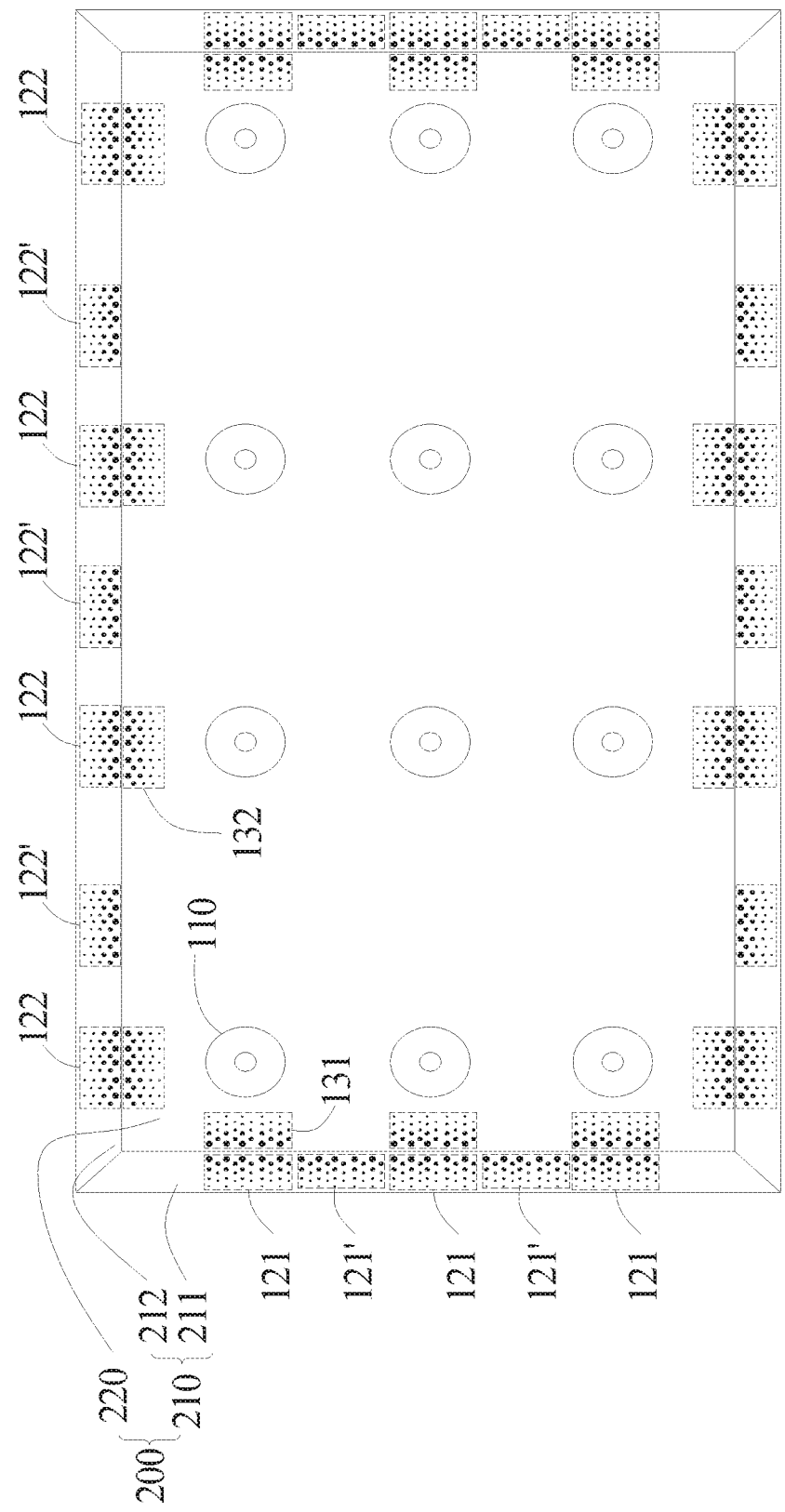
FIG. 7 is a schematic diagram of a backlight according to an embodiment of the present disclosure.

Certainly, the first light-modifying regions, the second light-modifying regions, and the third light-modifying regions may all be provided on a same backplane 200, as shown in FIG. 7. A width of the third modified region 132 parallel to the lateral sidewalls may be set to be equal to the width of the first light-modifying region on the lateral sidewall, and a center position of the third light-modifying region 132 is located in a same line as a center position of each of the light-emitting elements of a column. A width of the third light-modifying region 131 parallel to the longitudinal sidewalls may also be set to be equal to the width of the first light-modifying region on the longitudinal sidewalls, and the center position of the third light-modifying region 131 is located in a same line as a center position of each of the light-emitting elements of a row. Certainly, the width of each of the third light-modifying regions may be set as desired.

Figure 8:
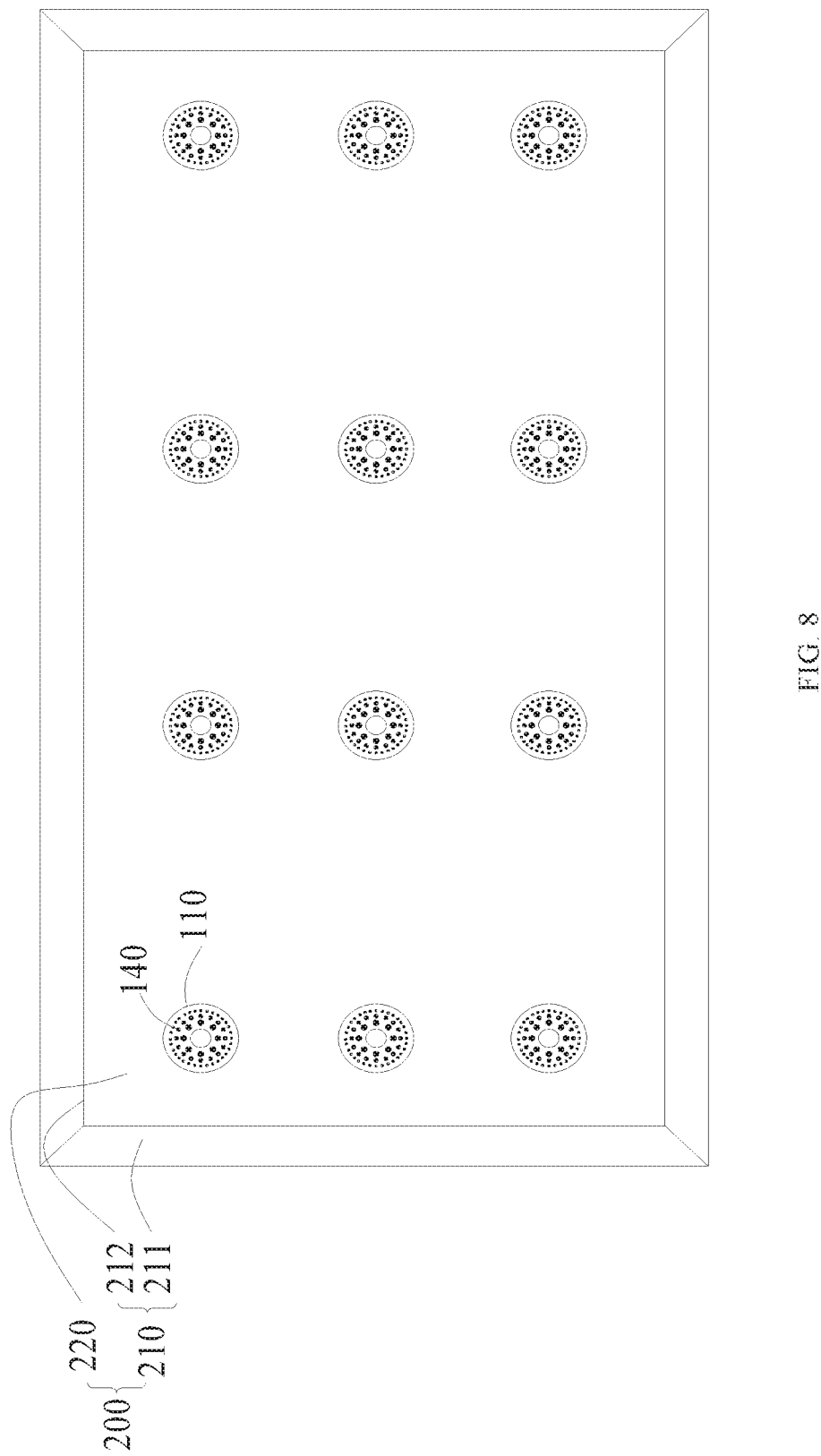
FIG. 8 is a schematic diagram of a fourth light-modifying region according to an embodiment of the present disclosure.

In some implementations, the light-modifying region further includes at least one fourth light-modifying region 140, a plurality of light-converting devices in the fourth light-modifying region 140 being arranged to surround a respective light-emitting element 110. Specifically, as shown in FIG. 8, corresponding fourth light-modifying regions 140 may be respectively provided around each light-emitting element 110.

Since the brightness of the region closer to the light-emitting element is larger, the fourth light-modifying regions 140 are provided around the light-emitting element, so that at least a portion of color light irradiated on the fourth light-modifying regions 140 can be converted into white light, thereby preventing the quantum dot layer cooperating with the backlight from being incapable of completely converting the light emitted from the region into white light, and improving the purity of the white light of the backlight module including the backlight.

Figure 9:
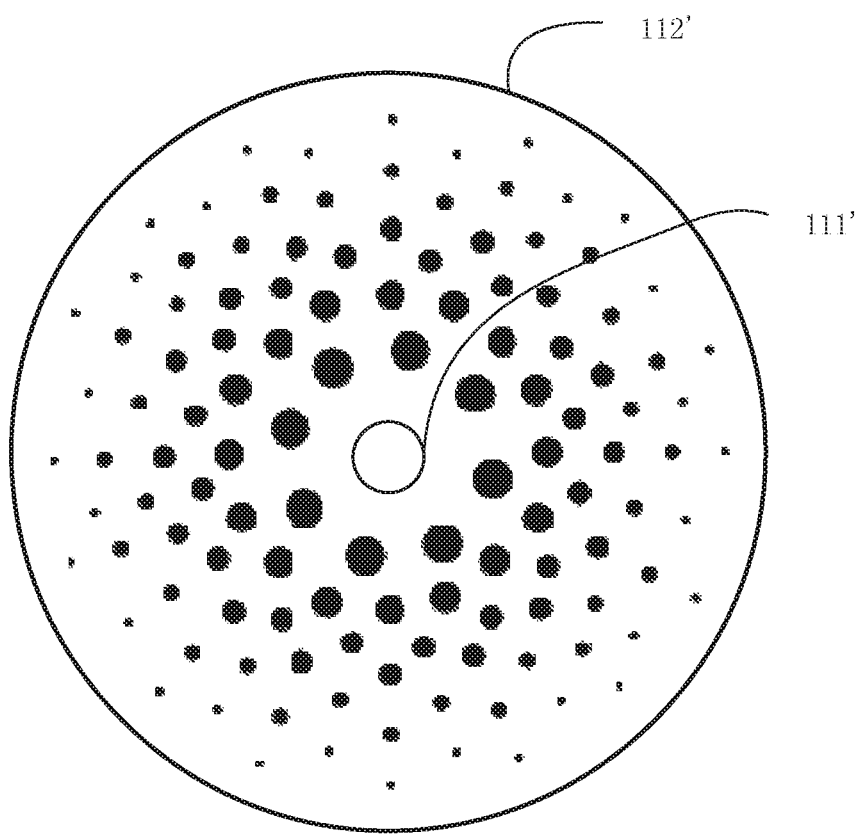
FIG. 9 is a schematic diagram of a light-converting device in the fourth light-modifying region according to an embodiment of the present disclosure.

It will be readily appreciated that, since the closer the position is to the light-emitting element, the greater the brightness at the position is, in some implementations, a size of each of the light-converting devices in the fourth light-modifying region is inversely correlated to a distance between the light-converting device and the light-emitting element corresponding to the fourth light-modifying region. Specifically, as shown in FIG. 9, a plurality of light-converting devices in the fourth light-modifying region 140 are arranged to surround the corresponding light-emitting element 110, and in a same fourth light-modifying region, the size of each of the light-converting devices is inversely correlated to the distance between the light-converting device and the light-emitting element 110 corresponding to the fourth light-modifying region 140. That is, the closer the light-converting device is to the light-emitting element 110, the larger the size of the light-converting device is.

In some implementations, the light-emitting element 110 includes a lens device 111 and a light emitting diode 112, the light emitting diode 112 is provided on the bottom plate 220, the lens device 111 is provided on top of the light emitting diode 112, and a space exists between the lens device 111 and the reflective sheet on the bottom plate 220, and an orthographic projection of the fourth light-modifying region 140 on the reflective sheet falls within an orthographic projection of the lens device 111 on the reflective sheet. Specifically, as shown in FIG. 9, the light-converting device is located between the orthographic projection 111' of the lens device 111 on the bottom plate 220 and the orthographic projection 112' of the light emitting diode on the bottom plate 220. In this way, the light emitted from the light emitting diode 112 and a portion of color light refracted/reflected/transmitted by the lens device 111 can be converted into white light.

Figure 10:
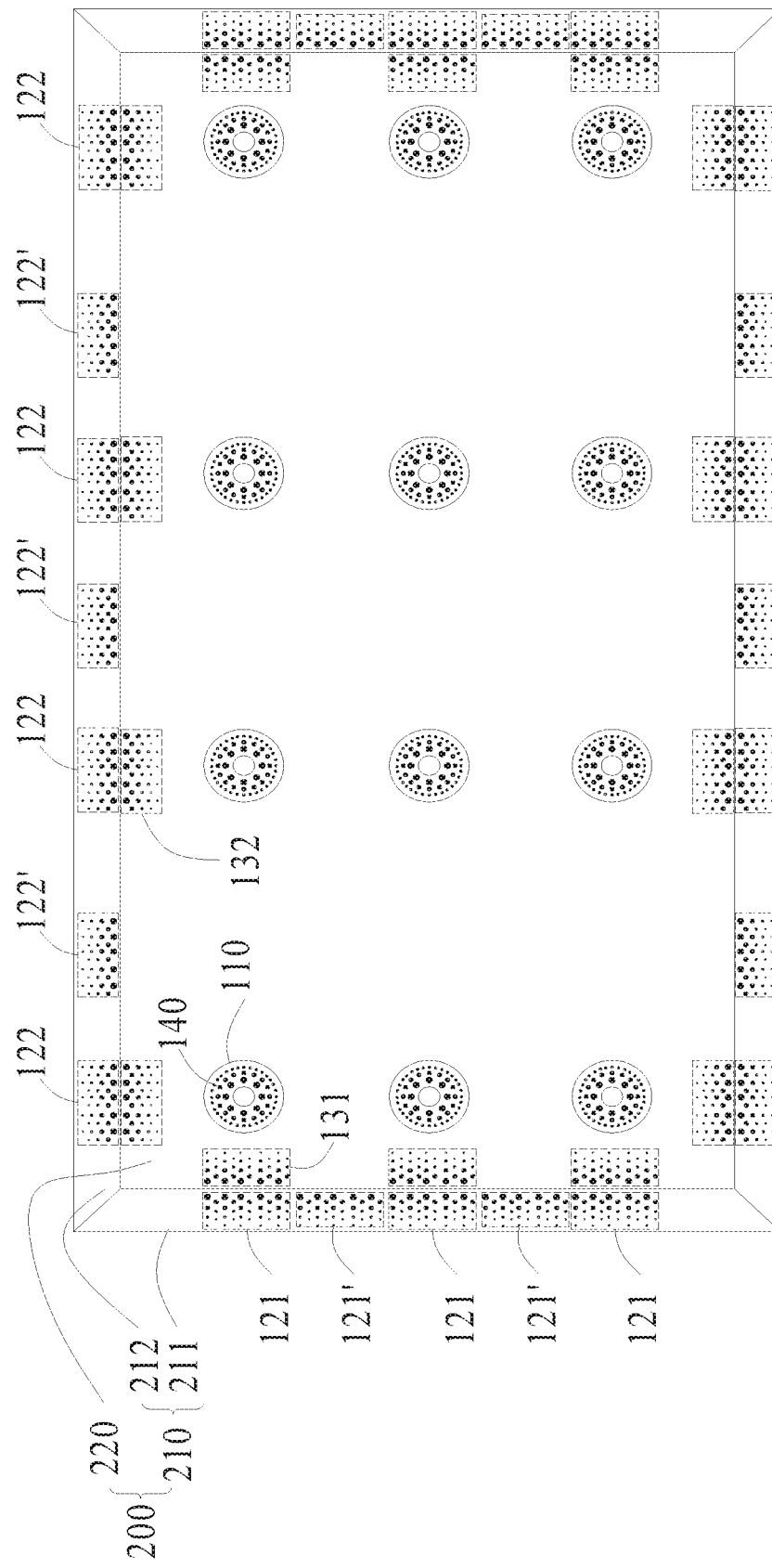
FIG. 10 is a schematic diagram of a backlight according to an embodiment of the present disclosure.

Certainly, the first light-modifying regions, the second light-modifying regions, the third light-modifying regions, and the fourth light-modifying regions may all be provided on a same backplane 200, as shown in FIG. 10.

In some implementations, the light-converting devices may be arranged in a staggered manner in any one of the first light-modifying region, the second light-modifying region, the third light-modifying region, and the fourth light-modifying region. Specifically, in any one of the first light-modifying regions, the second light-modifying regions and the third light-modifying regions, two adjacent rows of light-converting devices are arranged in a staggered manner; or two adjacent columns of light-converting devices are arranged in a staggered manner, as shown in FIGS. 1-7. In a same fourth light-modifying region, multiple rings of light-converting devices are arranged in a staggered manner, as shown in FIGS. 8 and 9. Origins of two adjacent (rings) rows of light-converting devices are arranged in a staggered manner or origins of two adjacent (rings) columns of light-converting devices are arranged in a staggered manner, and light-converting devices as many as possible can be arranged in the light-modifying region so as to improve the light conversion efficiency of the light-modifying region.

In a same first light-modifying region, origins of two adjacent rows of light-converting devices may also be arranged in a staggered manner; alternatively, origins of two adjacent columns of light-converting devices may be arranged in a staggered manner. It is to be noted that the origin of a column of light-converting devices refers to an end point at an end of the column of light-converting devices. Likewise, the origin of a row of light-converting devices refers to an end point at an end of the row of light-converting devices. The arrangement of the light-converting devices provided based on the origins is the same as that of the light-converting devices shown in FIGS. 1 to 7.

In some implementations, a shape of the light-converting device is circular, and the sizes of the light-converting devices in the first light-modifying region, in the second light-modifying region, in the third light-modifying region, and in the fourth light-modifying region are diameters of the light-converting devices. Specifically, as shown in FIGS. 1 to 7, each of the light-modifying regions includes a plurality of light-converting devices, each of the light-converting devices has a circular shape, and the plurality of light-converting devices may be arranged in a plurality of rows and a plurality of rows columns. Certainly, each of the light-converting devices may also have any other shape such as a rectangle, a diamond, etc., and the present disclosure is not limited thereto.

In a same light-modifying region, in the case where the shape of the light-converting device is circular, the size of the light-converting device is correlated to the diameter thereof, and therefore, the size of the light-converting device may be defined by defining the diameter of the light-converting device.

In the present disclosure, the color of light emitted from the light-emitting element is not particularly limited, and in an implementation, the light-emitting element may emit blue light. Accordingly, quantum dots in the light-converting device may convert the blue light into white light. The quantum dots can be excited by blue light into a plurality of other colors, such as red and green, which can be combined with the blue light to form white light.

In the present disclosure, the positions of the light-converting devices may be set according to specific needs. The arrangement of the light-converting devices is further described below with reference to the accompanying drawings.

Specifically, in the embodiment shown in FIG. 1, the reflective sheet is provided with the first light-modifying regions 121 at positions thereof on the longitudinal sidewalls 211 and facing rows of the light-emitting elements 110. The reflective sheet is provided with the first light-modifying regions 122 at positions thereof on the lateral sidewalls 212 and facing columns of light-emitting elements.

In the embodiment shown in FIG. 4, compared with that in FIG. 1, a second light-modifying region 121' is provided between positions of any two adjacent first light-modifying regions 121, and the first light-modifying regions 121 in FIG. 1 are not provided, a second light-modifying region 122' is provided between positions of any two adjacent first light-modifying regions 122, and the first light-modifying regions 122 in FIG. 1 are not provided.

In the embodiment shown in FIG. 5, the backplane includes both the light-modifying regions of FIGS. 1 and 4.

In the embodiment shown in FIG. 6, the reflective sheet is provided with the third light-modifying regions 131 at positions thereof at the borders of the bottom plate 220 and corresponding to the rows of light-emitting elements 110. The reflective sheet is provided with the third light-modifying regions 132 at positions thereof at the borders of the bottom plate 220 and corresponding to the columns of the light-emitting elements 110.

In the embodiment shown in FIG. 7, the backplane includes all the first light-modifying regions of FIG. 1, the second light-modifying regions of FIG. 4, and the third light-modifying regions of FIG. 6. That is, in the backplane shown in FIG. 7, the reflective sheet is provided with the first light-modifying regions 121 at positions thereof on the longitudinal sidewalls 211 and facing the rows of the light-emitting elements 110. The second light-modifying regions 121' are respectively provided between every two adjacent first light-modifying regions 121. The reflective sheet is provided with the first light-modifying regions 122 at positions thereof on the lateral sidewalls 212 and facing the columns of light-emitting elements. The second light-modifying regions 122' are respectively provided between every two adjacent first light-modifying regions 122. The reflective sheet is provided with the third light-modifying regions 131 at positions thereof at the borders of the bottom plate 220 and corresponding to the rows of the light-emitting elements 110. The reflective sheet is provided with the third light-modifying regions 132 at positions thereof at the borders of the bottom plate 220 and corresponding to the columns of the light-emitting elements 110.

In the embodiment shown in FIG. 8, the reflective sheet is provided with the fourth light-modifying regions 140 at positions thereof on the backplane 220 corresponding to the light-emitting elements.

In the embodiment shown in FIG. 10, the backplane includes all of the first light-modifying regions of FIG. 1, the second light-modifying regions of FIG. 4, the third light-modifying regions of FIG. 6, and the fourth light-modifying regions of FIG. 8. That is, in the backplane shown in FIG.

10, the reflective sheet is provided with the first light-modifying regions 121 at positions thereof on the longitudinal side walls 211 and facing the rows of the light-emitting elements 110. The second light-modifying regions 121' are respectively provided between every two adjacent first light-modifying regions 121. The reflective sheet is provided with the first light-modifying regions 122 at positions thereof on the lateral sidewalls 212 and facing the columns of light-emitting elements. The second light-modifying regions 122' are respectively provided between every two adjacent first light-modifying regions 122. The reflective sheet is provided with the third light-modifying regions 131 at positions thereof at the borders of the bottom plate 220 and corresponding to the rows of the light-emitting elements 110. The reflective sheet is provided with the third light-modifying regions 132 at positions thereof at the borders of the bottom plate 220 and corresponding to the columns of the light-emitting elements 110. The reflective sheet is provided with the fourth light-modifying regions 140 on a portion thereof on the bottom plate 220.

Certainly, the present disclosure is not limited to the structures in the above-described embodiments.

It should be noted that, although the direct type backlight is described in detail in the present disclosure, the disclosure may also be applied to a side-in-type backlight in which the light-emitting elements are provided on a side wall of the backlight and the light-converting devices are provided on the reflective sheet adjacent to the light-emitting elements.

According to a second aspect of the present disclosure, there is provided a backlight module, which includes a backlight and a quantum dot layer. The backlight is the above-mentioned backlight provided in the present disclosure. The quantum dot layer is provided on a light exiting side of the backlight. The quantum dot layer can convert light emitted by the light-emitting element into white light.

As described above, the light-modifying regions provided in the backlight can convert a portion of light irradiated on the light-modifying regions into white light, and the remaining color light that is not converted into white light is within the range of conversion efficiency of the quantum dot layer. When the color light that is not converted into white light by the light-converting devices is irradiated on the quantum dot layer, it is converted into white light by the quantum dot layer. A non-light-affected region is not provided with a light-converting device, and the light emitted from the non-light-affected region is color light with relatively low brightness and can be converted into white light by the quantum dot layer.

Therefore, the backlight module provided by the present disclosure can emit white light with high purity, thereby avoiding color shift of a display apparatus including the backlight module during displaying and the display effect is improved.

According to a third aspect of the present disclosure, a display apparatus is provided, and the display apparatus includes a display panel and a backlight module provided at a light incoming side of the display panel, the backlight module is the backlight module provided by the present disclosure, and the quantum dot layer is located between the backlight and the display panel.

Because the backlight module can emit white light with high purity, the color shift phenomenon of the display apparatus can be prevented when the display apparatus displays, and the display effect is improved.

In the present disclosure, specific structure of the display panel is not particularly limited. For example, the display panel may be a liquid crystal display panel, an electronic paper book, an electrochromic display panel, or the like.

It should be understood that, the above embodiments and implementations are merely exemplary embodiments and implementations for explaining principle of the present disclosure, but the present disclosure is not limited thereto. Various modifications and variants may be made by those ordinary skilled in the art within the spirit and essence of the present disclosure, these modifications and variants fall into the protection scope of the present disclosure.

What is claimed is:

1. A backlight, comprising a backplane, a reflective sheet and a plurality of light-emitting elements, an accommodating space is defined on an inner surface of the backplane, the reflective sheet is located on the inner surface of the backplane, wherein the backlight further comprises at least one light-modifying region, the light-modifying region is on the reflective sheet, the light-modifying region comprises at least one light-converting device, the light-converting device being capable of carrying out optical process on light emitted from the light-emitting elements, wherein the at least one light-modifying region comprises a plurality of first light-modifying regions, at least one second light-modifying region and at least one third light-modifying region, the second light-modifying region is adjacent to the first light-modifying region and is located between two adjacent columns of the light-emitting elements, the backplane comprises a bottom plate and a sidewall provided around edges of the bottom plate, the third light-modifying region is located on the reflective sheet at an edge of the bottom plate adjoined to the sidewall and is adjacent to the first light-modifying region, each of the plurality of first light-modifying regions, the at least one second light-modifying regions and the at least one third light-modifying region, comprises a plurality of light-converting devices arranged in a plurality of rows and a plurality of columns, and a size of each of the plurality of light-converting devices in a same third light-modifying region is positively correlated with the distance between the light-emitting elements corresponding to the third light-modifying region.

2. The backlight of claim 1, wherein the light emitted from the light-emitting elements is monochromatic light and the optical process is to convert the monochromatic light into mixed light.

3. The backlight of claim 2, wherein the mixed light is white light.

4. The backlight of claim 2, wherein the sidewall comprises longitudinal sidewalls and lateral sidewalls.

5. The backlight of claim 4, wherein the plurality of light-emitting elements are arranged in a plurality of rows and a plurality of columns on the bottom plate in the accommodating space, the plurality of first light-modifying regions located on the reflective sheet of at least one of the lateral sidewalls and the longitudinal sidewalls, wherein the first light-modifying regions located on the reflective sheet of the lateral sidewalls in a row direction of the light-emitting elements correspond to the columns of the light-emitting elements, and the first light-modifying regions located on the reflective sheet of the longitudinal sidewalls in a column direction of the light-emitting elements correspond to the rows of the light-emitting elements, wherein the row direction of the light-emitting elements is parallel to the lateral sidewalls, and the column direction of the light-emitting elements is parallel to the longitudinal sidewalls.

6. The backlight of claim 1, wherein a size of each of the light-converting devices in a same first light-modifying region is inversely correlated to a distance between the light-converting device and the light-emitting element corresponding to the first light-modifying region.

7. The backlight of claim 6, wherein each of the light-emitting elements comprises a package region, a width of each of the first light-modifying regions is less than or equal to a width or a ½ width of the package region of the light-emitting element.

8. The backlight of claim 5, wherein the at least one second light-modifying regions is located on at least one of the lateral sidewalls and the longitudinal sidewalls.

9. The backlight of claim 8, wherein the second light-modifying region on the longitudinal sidewall is located between two adjacent rows of the light-emitting elements.

10. The backlight of claim 9, a size of each of the light-converting devices in a same second light-modifying region is inversely correlated to a distance between the light-converting device and the light-emitting element corresponding to the second light-modifying region.

11. The backlight of claim 1, wherein the light-modifying region further comprise at least one fourth light-modifying region, a plurality of the light-converting devices in the fourth light-modifying region being arranged to surround a corresponding one of the light-emitting elements, and a size of each of the light-converting devices in the fourth light-modifying region is inversely correlated to a distance between the light-converting device and the light-emitting element corresponding to the fourth light-modifying region.

12. The backlight of claim 11, wherein each of the light-emitting elements comprises a lens device and a light-emitting diode, the light-emitting diode is located on the bottom plate, the lens device is located on top of the light-emitting diode, and a space exists between the lens device and the reflective sheet on the bottom plate, and an orthographic projection of the fourth light-modifying region on the reflective sheet falls within an orthographic projection of the lens device on the reflective sheet.

13. The backlight of claim 12, wherein in any one of the first light-modifying region, the second light-modifying region, the third light-modifying region, and the fourth light-modifying region, the light-converting devices are arranged in a staggered manner.

14. The backlight of claim 13, wherein a shape of each of the light-converting devices is circular, and the size of each of the light-converting devices in the first light-modifying region, in the second light-modifying region, in the third light-modifying region, and in the fourth light-modifying region is represented by a diameter of the light-converting device.

15. The backlight of claim 1, wherein each of the light-converting devices comprises a quantum dot material, and each of the light-emitting elements is capable of emitting blue light.

16. A backlight module, comprising a backlight and a quantum dot layer, wherein the backlight is the backlight of claim 1, the quantum dot layer is located on a light exiting side of the backlight, and the quantum dot layer is capable of converting light emitted from the light-emitting elements into white light.

17. A display apparatus, comprising a display panel and a backlight module located at a light incoming side of the display panel, wherein the backlight module is the backlight module of claim 16, and the quantum dot layer is located between the backlight and the display panel.

* * * * *